April 5, 1960   J. A. CAMPBELL   2,931,163
METER CLOCK WINDING DEVICE
Filed April 19, 1957   2 Sheets-Sheet 1
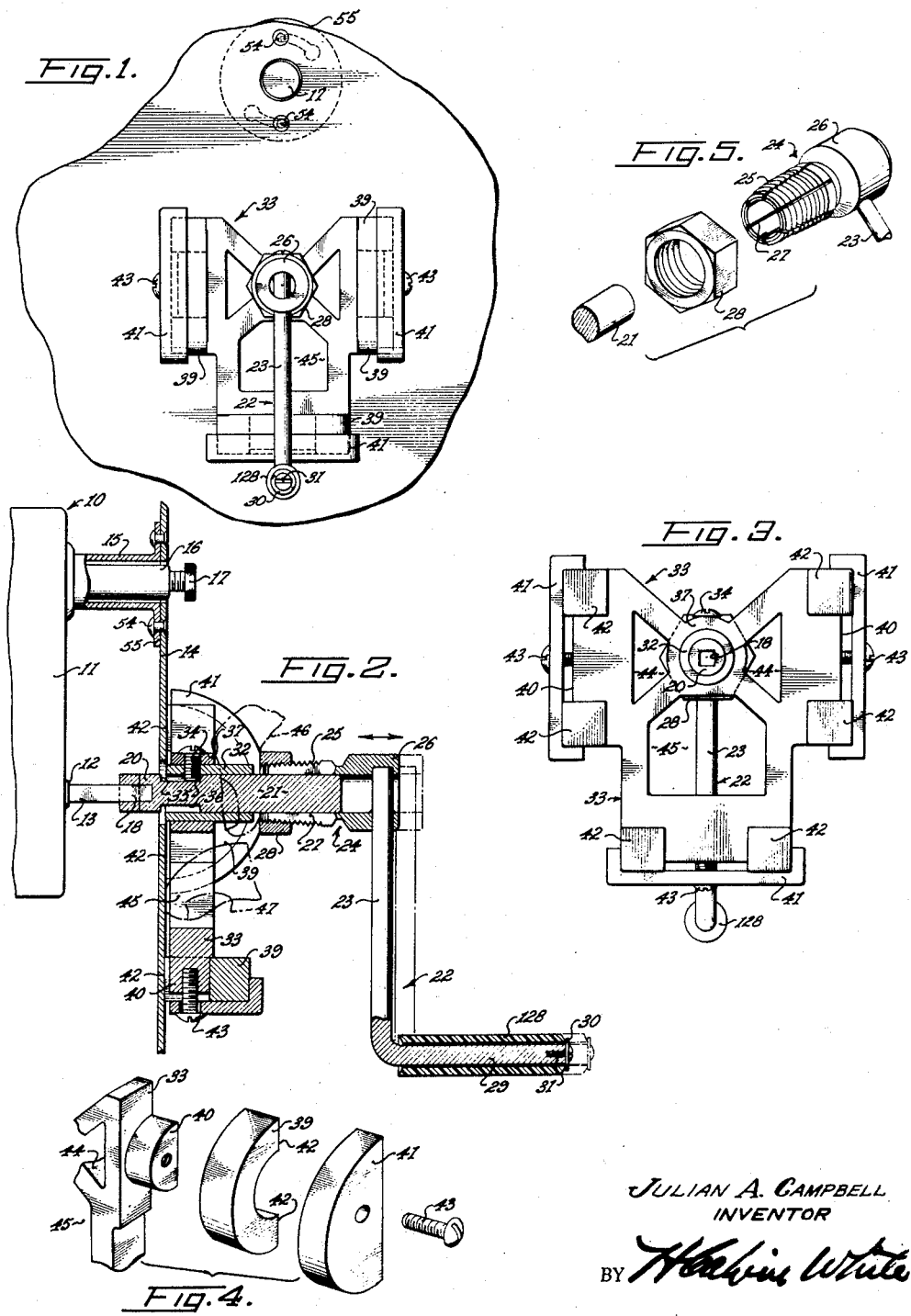
JULIAN A. CAMPBELL
INVENTOR
BY
ATTORNEY April 5, 1960
J. A. CAMPBELL
2,931,163
METER CLOCK WINDING DEVICE
Filed April 19, 1957
2 Sheets-Sheet 2
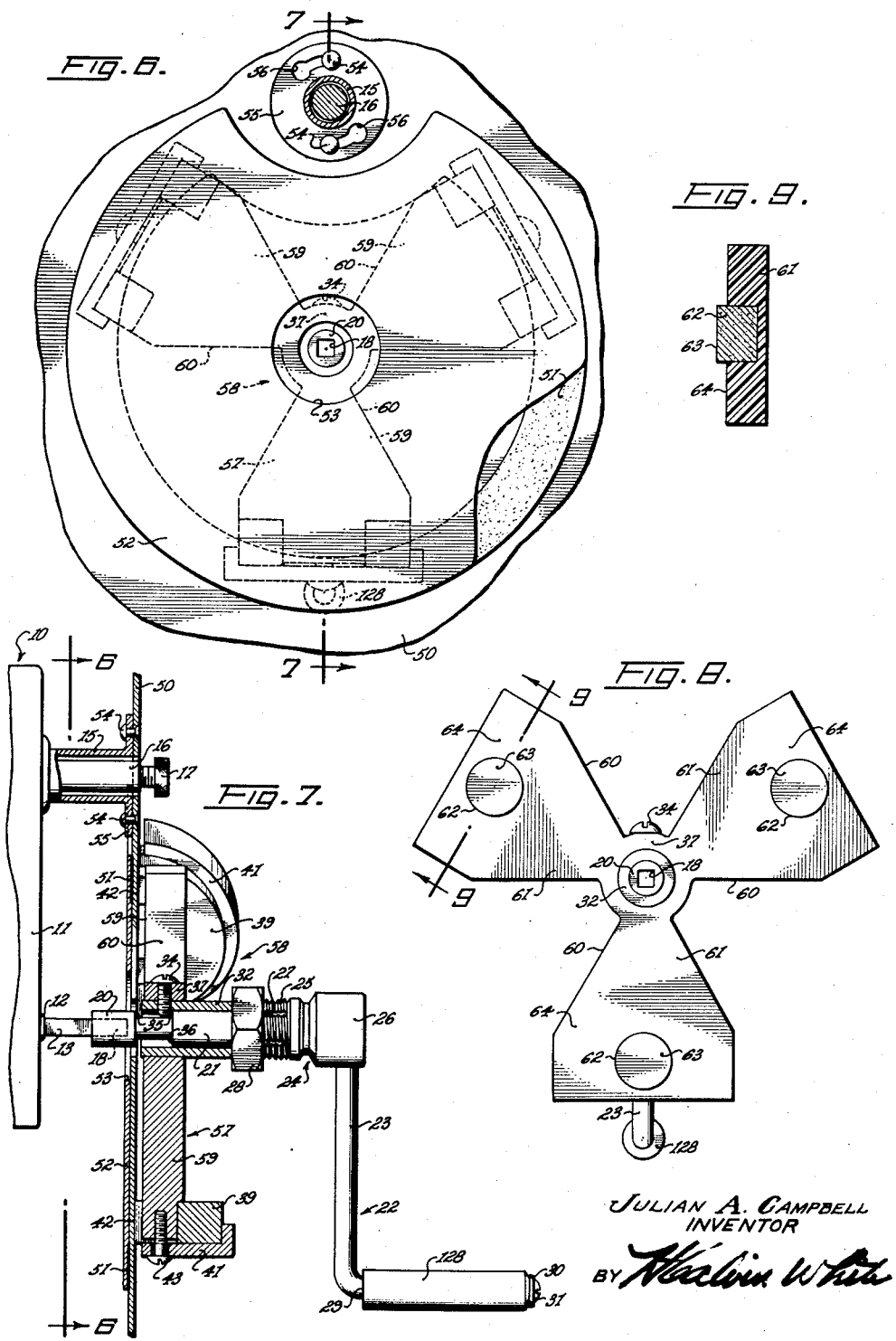
JULIAN A. CAMPBELL
INVENTOR
BY
ATTORNEY

United States Patent Office 2,931,163
Patented Apr. 5, 1960

2,931,163

METER CLOCK WINDING DEVICE

Julian A. Campbell, Long Beach, Calif.

Application April 19, 1957, Serial No. 653,910

12 Claims. (Cl. 58—46)

This invention relates generally to specially constructed devices for winding meter clocks, and more particularly has to do with a mechanism of this kind having novel design and characterized in its use by combining ease of winding with the substantial elimination of undesirable strains imparted to the clock components by the device.

There are in this county alone a very large number of spring operated clocks on gas meters and recording instruments, which require periodic winding, as for example each day or once every seven days. A typical meter clock has a spring revolved shaft mounting a steel back-up plate with the shaft projecting through both the plate and a chart detachably secured on the shaft by a knurled nut, so that the shaft turns the chart through one complete revolution over the surface of the plate in twenty-four hours or one week. The pens which engage the charts to record temperature and pressure are normally actuated by temperature sensitive expansion elements, by static pressure measuring Bourdon tubes and by mercury floats operating to record differential pressures across orifice meters.

The clock winding stems are generally of reduced size, as for example .146 inch square, and they extend through small bearings mounted in very thin clock cases which may be made of brass, aluminum or steel. Inasmuch as the stem end is located slightly back from the face of the back-up plate, it has been customary to wind the stem by means of a winged brass key having a square hole broached in the end of the key shaft to fit over and engage the winding stem. To wind the clock, the key wings are gripped with the thumb and first finger and rotated one-half turn, after which the key is released and re-gripped for another half-turn, these motions being repeated until the clock spring is fully wound. Some meter clocks have two springs each of which must be wound by this slow and laborious process, and eight day clocks have rather strong springs so that winding of very many clocks per day by this crude method makes the fingers sore.

As a result, there arose the practice of nipping off the key wings and soldering or brazing a hand crank to the stem, making possible much faster and less painful clock winding. However, normal hand cranking produces side thrust forces transmitted through the unsupported crank, to the clock stem and bearing and to the instrument case, resulting in undesirable wear of the interengaged clock stem and bearing and continued flexing of the clock case so that the latter often crystallized and broke, the entire clock stem and bearing then falling out of the meter requiring the installation of a new case. Also, wearing of the crank shaft broaching causes greater wobble during winding, putting more side loading on the meter stem and case. Attempts to solve these difficulties have taken the form of double hand crank designs, but there still remains the difficulty of undesirably great leverage exertion on the clock stem if the operator does not keep the winder shaft in alignment with the stem axis.

The present invention solves the above mentioned problems through the provision of a novel winder that incorporates a hand cranked winding shaft which is supported for axial rotation by means extending transversely of the shaft axis, the support carrying permanent magnets applicable against the magnetically attractive meter back-up plate structure for holding the rotatable support against bodily displacement transversely relative to the axis of the meter stem when the shaft is coupled in winding relation therewith and rotated by the crank. Thus magnets hold the device firmly in position against the back-up plate structure for transferring the main side loading from the crank shaft to the plate instead of to the clock stem bearing and case as occurred before. At the same time, the clock may be wound very rapidly due to mechanically advantageous cranking action, even though the clock spring is stiff, all without strain on the case or winding stem since the crank shaft is held normal to the face of the meter.

These and other features and objects of the invention, as well as the details of an illustrative embodiment, will be more fully understood from the following detailed description of the drawings, in which:

Fig. 1 is a front elevation showing the device in clock winding position;

Fig. 2 is a side elevation in section showing the winding device coupled to the meter clock;

Fig. 3 is a rear elevational view of the winding device;

Fig. 4 is an exploded perspective showing of a fragmentary portion of the winding device;

Fig. 5 is an exploded perspective view of another portion of the winding device;

Fig. 6 is a rear elevation showing a slightly modified winding device attracted against the clock structure;

Fig. 7 is a section taken on line 7—7 of Fig. 6;

Fig. 8 is a rear elevation showing another slightly modified winding device; and Fig. 9 is a section taken on line 9—9 of Fig. 8.

In Figs. 1 and 2 an illustrative meter clock generally indicated at 10 includes a thin case 11 mounting a sleeve bearing 12 in which a winding stem or arbor 13 is journaled for rotation. The meter also includes a steel face or back-up plate 14 extending normal to the axis of the stem in endwise spaced relation to the case, and held in position relative to the case structure on a hub 15.

A shaft 16, slowly rotatable by the clock spring, extends within the hub 15, the shaft being adapted to support a chart (not shown) normally held on the shaft end by a fastener 17 threaded into the shaft so that the chart slips against the outer surface of the plate 14 when slowly rotated by the shaft once every 24 hours or 7 days, as the case may be.

The externally square broached end 18 of the winding stem projects outwardly from case 11 to a point slightly back from the plane of plate 14, its exact location being variable as between different makes of clocks. A coupling 20 on the end of a horizontal shaft 21 is fitted over the stem end for gripping and rotating the latter to wind the clock spring when the shaft is turned by a hand crank assembly 22.

A crank arm 23 is connected to the shaft 21 through an adjustable slip chuck 24 including an externally tapered and threaded sleeve 25 connected with the crank hub 26 and containing five longitudinal splits 27, as better illustrated in Fig. 5. A nut 28 threaded on the sleeve adjustably clamps the sections between the splits against the shaft, the frictional clamping adjustment preferably being such that during a winding operation the sleeve 25 will slip over the shaft when the torque transmitted by the hand crank equals or exceeds the reaction torque of the wound clock spring. For ease of winding, a plastic sleeve or runner 128 is loosely retained on the crank handle 29 by a washer 30 and screw 31 threaded into the end of the handle.

The section of the horizontal shaft 21 intermediate the coupling and the slip chuck is journaled for rotation within a hardened sleeve 32 centrally mounted in a T-shaped casting or base 33 better shown in Fig. 3 as extending transversely of the shaft axis in a vertical plane normal thereto. The shaft has a running fit with the bearing 32, and is also axially movable relative thereto between endwise limits established by engagement of a screw 34 with spaced shoulders 35 at the opposite ends of an annular groove 36 cut in the external surface of the shaft. The screw is threaded through the hub 37 of the base and through the bearing 32 to project within the groove as illustrated in Figs. 2 and 3. Endwise sliding movement of the shaft between the established limits is necessary to accommodate proper engagement of the coupling 20 with the ends of different winding stems or arbors which are set back at different spacing from the plane of the back plate 14 in various makes of meter clocks as described above.

The T-shaped base 33, which may advantageously be made of a lightweight metal such as aluminum, carries three C-shaped permanent magnets 39 at laterally opposite sides of and below the base hub 37, as seen in Figs. 1 and 3. Each magnet, typically having high magnetic strength as for example is characteristic of Alnico magnets, is supported on an ear or flange 40 of the base and is externally shielded and retained in position by a non-magnetic cover or retainer 41, so that opposite magnet end faces 42 extend in a vertical plane normal to the shaft axis and are exposed for attraction to the back-up plate 14. The removable covers 41 are held against the magnets by screws 43 threaded into the ears 40 in such relation that the magnet faces 42 are offset slightly from the base and cover structure for direct application to the plate.

The base 33 contains a pair of opposite side openings 44 to reduce its weight, and a larger opening 45 beneath the hub and the shaft that is large enough to freely accommodate passage of the user's thumb 47 shown in broken lines in Fig. 2 for purposes as will appear.

In considering the application of the winding device to a meter clock, the operator holds the unit spaced from the clock in upright position as shown in the drawings with the shaft 21 positioned at its leftward limit with respect to the base. This enables him to guide the coupling 20 over the winding stem 18 after the lower magnet has touched the face plate 14, the above described guiding action permitting the upper two magnets to seat in proper position against the face plate, at which time the winding device is held very firmly in coupled condition with the stem 18 and against the face plate 14. The crank is then rotated to wind the clock, all side thrust created as a result of cranking being transmitted through the base and magnets to the plate 14 instead of to the winding stem. As a result, the clock may be wound very rapidly, even though it has a stiff spring, with no strain on the stem of the clock case.

After the clock has been wound, the shaft 21 is grasped between the user's first two fingers as indicated in Fig. 2 by the broken lines 46, and the thumb 47 is passed through the opening 45 into engagement with the back plate 14. By exerting leverage on the back plate through the thumb, the first two fingers are enabled to pull against the nut 28 and retract the shaft to its endwise rightward limit of travel with respect to the screw 34, after which a further pull causes the magnets to disengage from the plate 14 for complete removal.

As shown in Fig. 2, before final removal of the winder off the plate, the shaft coupling 20 may be almost completely disengaged from the winding stem 18, as a result of endwise retraction of the shaft with respect to the screw 34, thereby preventing undesirable side loading against the stem, when the winder is bodily removed off the plate.

There is no danger of magnetizing the clock spring, since the face plate 14 completes the magnetic circuit between the magnet faces, and also because of the fact that the distance from the magnets to the spring in commercial meter clocks is about three inches.

Actual use of these clock winders by experienced personnel has shown no deleterious action whatever upon the clocks. Furthermore, meter men may wind as many as 125 clocks per day of many different makes with less effort and in less time than previously, feeling assured that no damage has been done the clocks in any way.

The modified form of the invention shown in Figs. 6 and 7 has the same components, similarly numbered, as were described previously, with the exception of the structure that will now be described. The meter chart plate 50 is non-ferrous and therefore not itself attractive to the magnets. However, bonded to the rear side of the plate, as by an annular strip of adhesive 51, is an annular ferrous plate 52 centered with respect to the axis of the shaft 21, so that the coupling 20 may extend through the plate opening 53 and over the winding stem 13. The plate 52 is readily bonded in position after removal of the non-ferrous plate 50 from the hub 15, as by rotating that plate and its rivet heads 54 away from locking interengagement with the hub flange 55, so that the rivet heads slip out of the flange openings 56, better shown in Figs. 1 and 6.

The base 57 of the modified winding device 58 shown in Figs. 6 and 7 again may comprise a lightweight metal such as aluminum, and includes three legs 59 equispaced about the shaft axis and forming openings 60 between the legs. These three spaces extend much closer to the hub 37 than the C-shaped magnets 39 carried in the ends of the legs so as to give finger access through the openings for gripping the hub 37 during both application and removal of the winding device as respects locating it on the plate 50 for winding the stem 13. Thus, the coupling 30 may be very quickly applied over the stem end since the latter may be viewed through the openings 60 during application of the winding device against the plate 50.

In this form of the invention, the magnets are mounted on the ends of the legs in a manner similar to the showing of Fig. 4, with the magnet faces exposed to the plate 50 and symmetrically located with respect to one another, all as seen in Fig. 6.

The shape of the base 60 shown in Figs. 8 and 9 is the same as that as shown in Figs. 6 and 7; however, it comprises a molded plastic material, and preferably comprises thermo-setting resin such as phenol formaldehyde, melamine modified formaldehyde, alkyd thermosetting resin, nylon or Teflon, these latter being well-known trade names for particular resinous compositions. Molded into the lightweight base legs 61 at their outer extremities are magnet inserts 62, the latter having exposed faces 63 offset from the side 64 of the base corresponding to the coupling 20. Thus, the modified winding device shown in Figs. 8 and 9 has minimum weight, adapting it for convenient carriage by clock winders, as for example in the pockets of their clothing.

I claim:

1. A device for winding a meter clock including a winding stem and structure extending transversely of the stem axis and toward which a magnet is attractable, said device comprising an assembly including a shaft having an axis of rotation, a coupling rotatable by the shaft for turning the clock winding stem and a crank for rotating the shaft, support means including a magnet extending transversely of said shaft axis supporting the shaft for rotation without relative transverse displacement, said magnet being adapted to be attracted against said meter clock so that said support means will be held against bodily displacement transversely relative to the axis of the meter stem when the shaft is coupled in winding relation therewith and rotated by said crank.

2. A device for winding a meter clock including a winding stem and structure extending transversely of the stem axis and toward which a magnet is attractable, said clock having a spring adapted to be wound, said device comprising an assembly including a shaft having an axis of rotation, a coupling rotatable by the shaft for turning the clock winding stem, a crank for rotating the shaft and a slip connection between the crank and shaft adapted to slip whenever winding torque applied to said connection exceeds the reaction torque of the wound clock spring, support means including a magnet extending transversely of said shaft axis supporting the shaft for rotation, said magnet being adapted to be attracted against said meter clock so that said support means will be held against bodily displacement transversely relative to the axis of the meter stem when the shaft is coupled in winding relation therewith and rotated by said crank.

3. A device for winding a meter clock including a winding stem and structure extending transversely of the stem axis and toward which a magnet is attractable, said device comprising an assembly including a shaft having an axis of rotation, a coupling rotatable by the shaft at one end thereof for turning the clock winding stem and a crank for rotating the shaft in axially spaced relation to the coupling, support means including a base and a plurality of permanent magnets carried by said base extending transversely of said shaft axis and supporting the shaft intermediate said coupling and crank for said axial rotation, said magnets being exposed at the coupling side thereof to be attracted against said meter clock so that said support means will be held against bodily displacement transversely relative to the axis of the meter stem when the shaft is coupled in winding relation therewith and rotated by said crank, said magnets being spaced from the shaft and at intervals about the shaft axis.

4. The invention as defined in claim 3 in which said base contains an opening extending between axially spaced opposite sides of the base and closer to the shaft than said magnets providing digital access to the coupling side of said assembly when said assembly is hand gripped for push removal of the magnets off said structure.

5. The invention as defined in claim 3 comprising a sleeve mounting the shaft for endwise axial displacement relative to the base, said shaft having axially spaced stop shoulders, and an element extending transversely through the sleeve into the space between said shoulders for alternate engagement with said shoulders to limit said shaft endwise displacement.

6. The invention as defined in claim 3 including an adjustable slip connection between the crank and shaft adapted to slip whenever winding torque applied to said connection exceeds the reaction torque of the wound clock spring.

7. The combination, comprising a meter clock including a winding stem and structure extending transversely of the stem axis and toward which a magnet is attractable, an assembly including a shaft having an axis of rotation and detachably coupled with the clock winding stem and a crank for rotating said shaft, support means including a magnet extending transversely of said shaft axis supporting the shaft for rotation, said magnet being attracted against said meter clock so that said support means is held against bodily displacement transversely relative to the axis of the meter stem when the shaft is rotated by the crank to wind the clock.

8. The combination, comprising a meter clock including a winding stem and structure extending transversely of the stem axis and toward which a magnet is attractable, an assembly including a shaft having an axis of rotation, a coupling detachably coupled with the clock winding stem and rotatable by the shaft at one end thereof and a crank for rotating the shaft with the crank in axially spaced relation to the coupling, support means including a base and a plurality of permanent magnets carried by said base extending transversely of said shaft axis and supporting the shaft intermediate said coupling and crank for said axial rotation, said magnets being exposed at the coupling side thereof and attracted against said meter clock so that said support means is held against bodily displacement transversely relative to the axis of the meter stem when the shaft is rotated by the crank to wind the clock.

9. The invention as defined in claim 8 in which said clock includes a meter chart plate against which said magnets are applied, said plate containing an opening through which said coupling is received.

10. The invention as defined in claim 9 in which said chart plate is thin and non-ferrous, and said clock includes a ferrous plate attached to the side of said chart plate opposite the magnets.

11. The invention as defined in claim 9 including an adjustable slip connection between the crank and shaft adapted to slip whenever winding torque applied to said connection exceeds the reaction torque of the wound clock spring.

12. The invention as defined in claim 9 in which said base contains an opening extending between axially spaced opposite sides of the base and closer to the shaft than said magnets providing digital access to said chart plate when said assembly is hand gripped for push removal of the magnets off said plate.

References Cited in the file of this patent

UNITED STATES PATENTS

| 389,931 | Lane | Sept. 25, 1888 |
| 1,592,942 | Hanson | July 20, 1926 |

FOREIGN PATENTS

| 477,573 | Great Britain | Jan. 3, 1938 |